Sept. 10, 1968    G. A. MAGUIRE ET AL    3,400,449
METHOD OF PREPARING A SURFACE FOR WELDING
Filed June 6, 1966    3 Sheets-Sheet 1
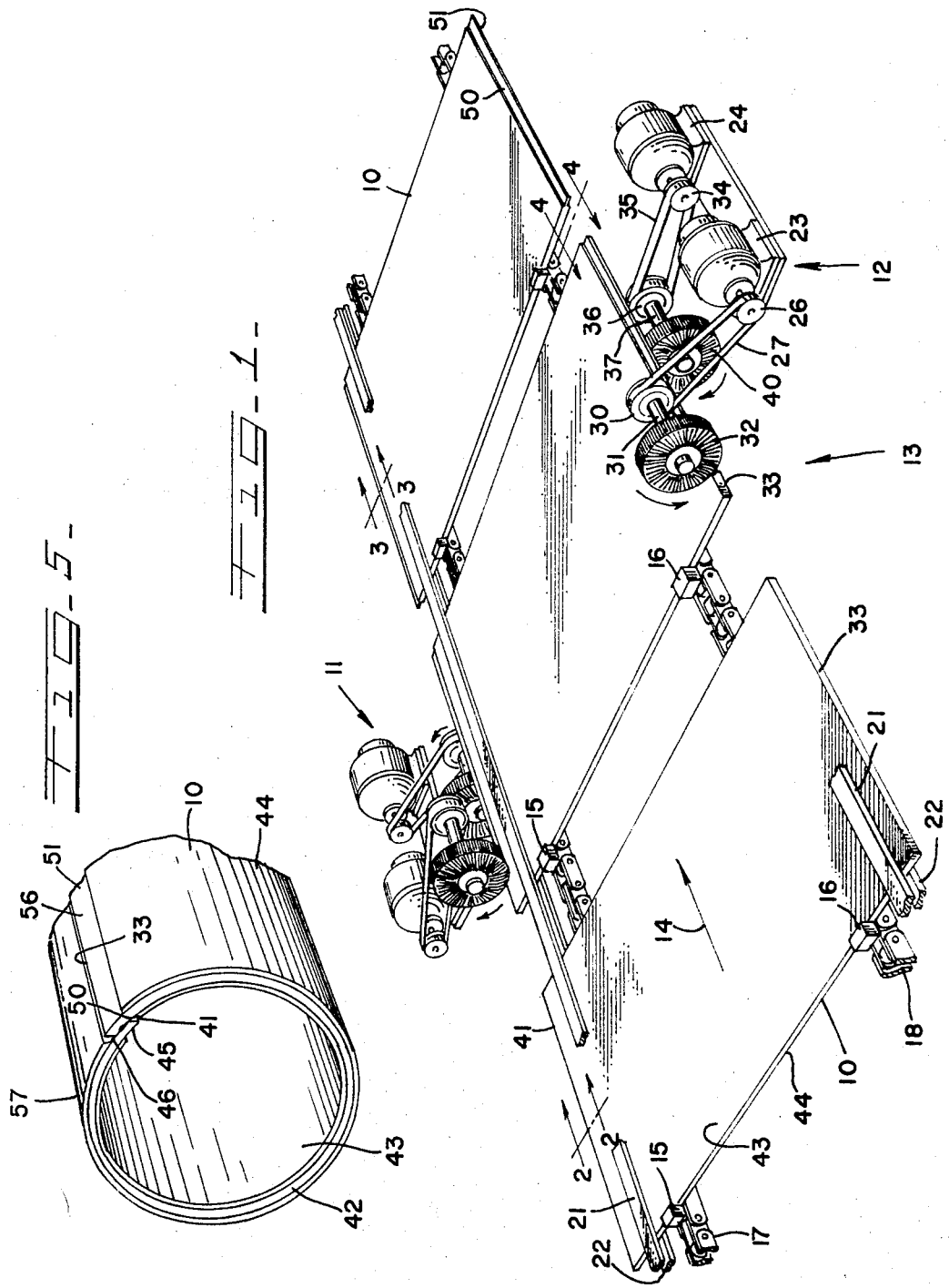
INVENTORS
GEORGE A. MAGUIRE
MATTHEW A. OSTROFSKY
VINCENT C. SZELIGO
BY Walter H. Beland
AGENT Sept. 10, 1968   G. A. MAGUIRE ET AL   3,400,449
METHOD OF PREPARING A SURFACE FOR WELDING
Filed June 6, 1966   3 Sheets-Sheet 2
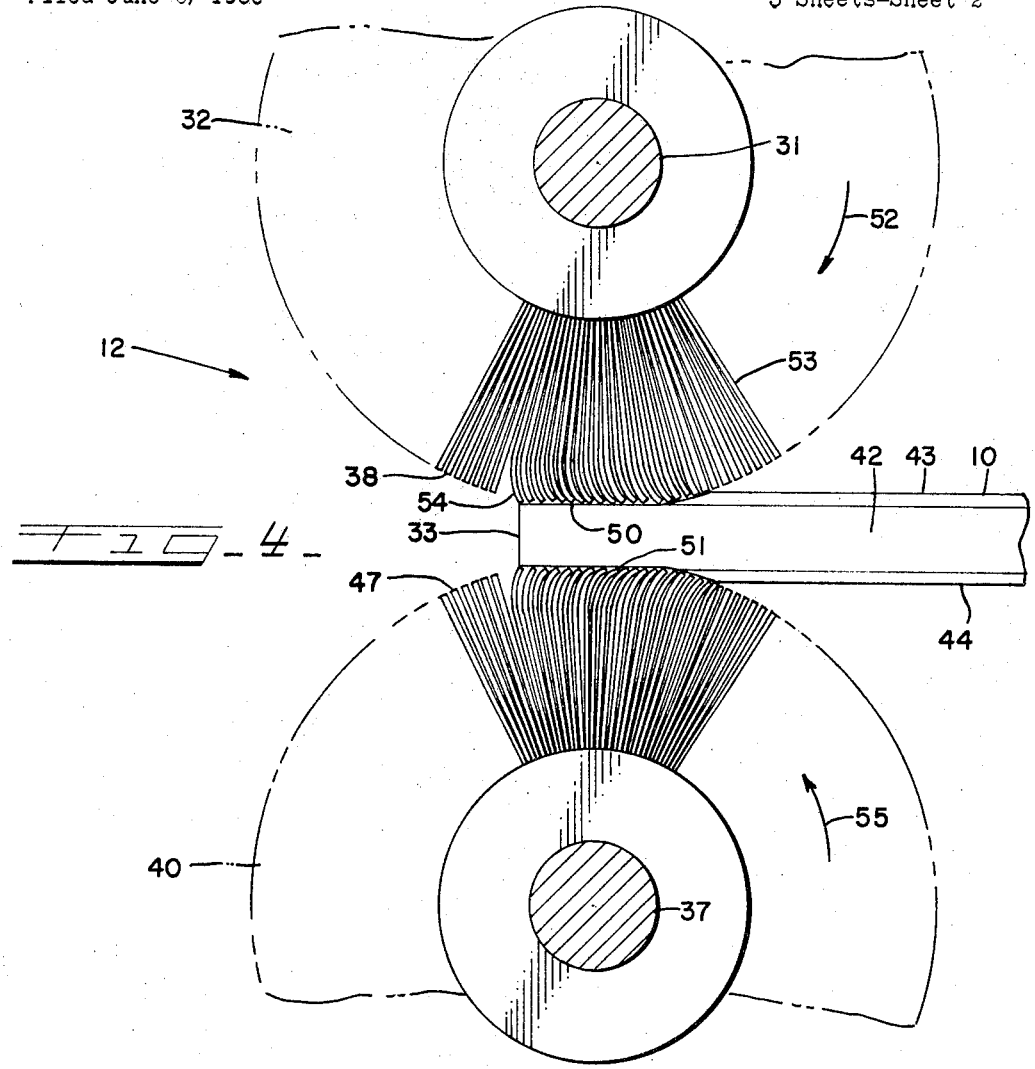
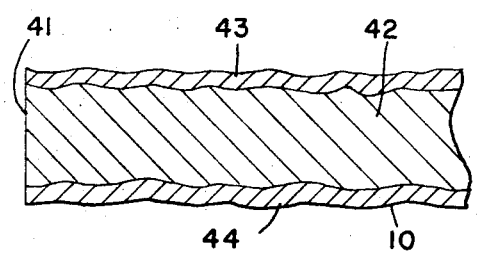
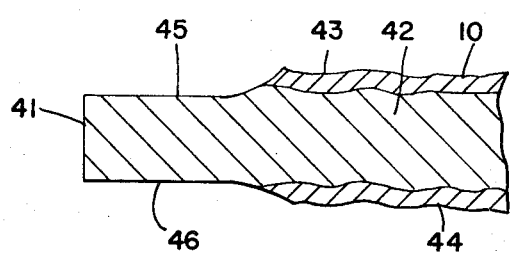
INVENTORS
GEORGE A. MAGUIRE
MATTHEW A. OSTROFSKY
VINCENT C. SZELIGO
BY Walter H. Beland
AGENT

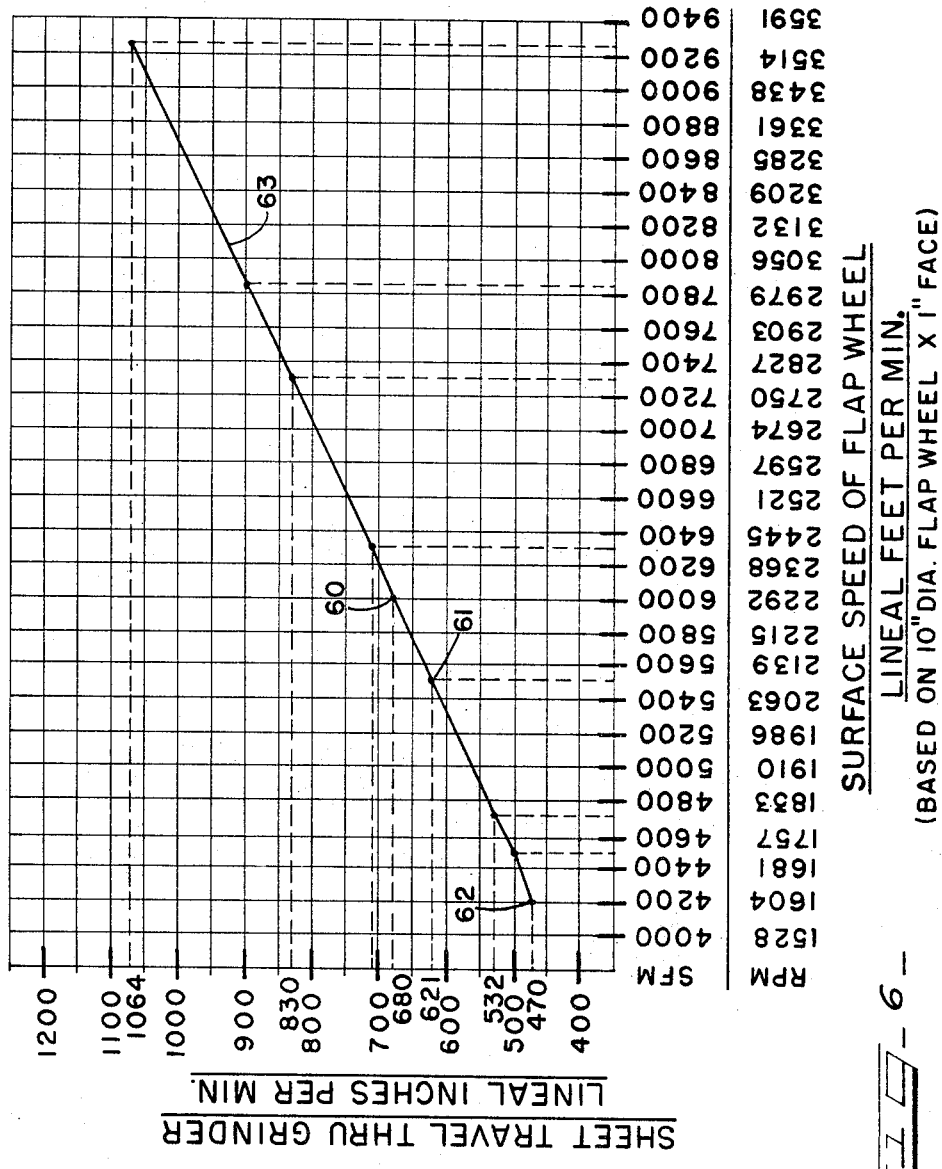

United States Patent Office 3,400,449
Patented Sept. 10, 1968

3,400,449
METHOD OF PREPARING A SURFACE FOR WELDING
George A. Maguire, Matthew A. Ostrofsky, and Vincent C. Szeligo, Pittsburgh, Pa., assignors to Continental Can Company, Inc., New York, N.Y., a corporation of New York
Filed June 6, 1966, Ser. No. 555,293
4 Claims. (Cl. 29—483)

This invention generally relates to the art of making containers, such as cans or pails, having either straight or tapered side walls, from sheet steel having a protective tin coating on opposite sides thereof.

The body portion for such containers is made by forming a blank of such tin-plated steel around a forming mandrel and then joining together adjacently disposed marginal edge portions of the blank by one of several methods. The invention has specific application wherein the adjacent marginal edges of the formed container body blank are overlapped slightly and interfacing overlapped surfaces adjacent thereto are welded together along their length so as to form a container body having a welded longitudinal side seam. In order to satisfactorily perform the welding operation, it is necessary to priorly remove the tin coating and any oxides that may be present on the underlying tin from both sides of the blank along the areas thereof that will be overlapped. Any tin remaining in the interface formed between the overlapped surfaces adjacent the marginal edges, or any oxide present, may result in discontinuities existing in the longitudinal weld and a leaky or weak side seam. During the welding operation, opposed copper resistance welding rolls or other copper resistance welding tools are employed to press the blank portions adjacent the overlapped marginal edges together and effect the welding together thereof along the overlapped interface. In order for these welding implements to have a satisfactory life expectancy it is necessary that the tin coating or plating be removed from the exposed surfaces adjacent the container side seam lapped edges on which they bear as otherwise tin will be picked up by the welding implements and will gradually build up thereon until the welding implements are no longer able to perform their function.

In accordance with one prior art practice, the container body blanks were fed into a grinding device in which carborundum grinding wheels tapered the edges of the blank that overlap to form the side seam in a manner similar to the way the opposed cutting edges of the ordinary double-edge safety razor blade are ground. Difficulties were encountered with this method, however, in that the grinding wheels would soon become clogged with tin and would cease to function. Another difficulty encountered was that the desired tin-free width of overlap could not be achieved on a commercially acceptable basis with the result that the welded side seam did not have the desired amount of overlap. Also, due to the narrow width of tin that was removed adjacent the marginal blank edges when employing this method, the welding rolls or other welding implements employed to weld the side seam became contaminated with tin pick-up in a short period of time with the consequence that it was necessary to replace them frequently. Other prior art attempts for removing the tin and underlying oxides adjacent opposed marginal edge portions of the body blanks, such as, for example, by means of rotating wire brushes, or by means of belt type sanders, were likewise unsuccessful for various reasons.

In accordance with the mechanical process of the invention, the tin and underlying oxides as well as surface irregularities in the underlying steel can be successfully removed on a production basis by employing abrasive wheels made up of closely packed strips of abrasive coated or impregnated cloth fabric. The individual strips of cloth in such wheels are similar to emery cloth with the abrasive grits being applied to only one side thereof. It was found in carrying out the mechanical process of the invention that such flap wheels as they are called will wear down at a rate slightly faster than they become clogged with tin so that the clogging problem encountered with the usually employed solid type of grinding wheel is avoided.

In early machines employing flap wheels for removing the tin plate and cleaning the underlying steel; flap wheels approximately 10 inches in diameter and 1 inch wide were used and driven by constant speed motors at a relatively low peripheral surface speed. Four such flap wheels were employed; one for grinding the tin from each tin coated surface adjacent the opposed marginal side seam forming blank edges prior to welding. In a single pass through the machine, the tin coatings were partially removed. In a second pass through the machine, the tin coatings were substantially removed except from in valleys existing in the uneven underlying steel surfaces. In a third pass, however, this residual tin was removed and the exposed surfaces of the underlying steel made substantially smoother with any oxide thereon also being removed. The sheets were fed through the machine at a lineal speed of 680 inches per minute and the flap wheels were turned directly by electric motors at 1750 revolutions per minute giving a peripheral surface speed of approximately 4,500 lineal feet per minute. The position of the flap wheels was adjusted so that contact between the flap wheels and the blanks was relatively light. It was found that if the flap wheels were positioned so as to increase the pressure thereof against the blanks in an attempt to remove the tin plate coatings in a single pass through the machine, defective blanks were produced in that the blanks were burned, cracked, or checked due to the increased friction. Another result, because of the deeper penetration of the grits of the flap wheels, was the clogging of the surfaces of the flap wheels by the tin.

Subsequently, during the development of the invention, variable speed drive motors were provided to drive the flap wheels at pre-selected rotational speeds so as to permit the selection of a desired flap wheel surface speed. By experimenting with the speed of the flap wheels, it was found that with a sheet speed through the machine of 680 lineal inches per minute, that by rotating the flap wheels at 2292 revolutions per minute, giving a surface speed of 6,000 lineal feet per minute, with the flap wheels bearing only lightly against the blanks, substantially all of the tin and underlying oxides could be removed in a single pass of the blanks through the machine without burning, cracking, or checking of the blanks. Further tests were run at higher and lower production range sheet travel speeds through the machine with the speed of the flap wheels being adjusted so that again the tin was removed in one pass of the blanks through the machine without any burning, cracking, or checking of the blanks. A graph was then constructed in which sheet travel speed in lineal inches per minute through the machine was used as the ordinate and surface speed of the flap wheels in lineal feet per minute was used as the abscissa. It was found that the intercept points of the abscissa and ordinate for various sheet travel speeds plotted along the ordinate and for corresponding experimentally determined optimum flap wheel surface speeds plotted along the abscissa were at locations through which a nearly straight line could be drawn. This substantially linear relationship between the sheet travel speed and the surface speed of the flap wheels was found to be, for all practical purposes, satisfied by the equation $X=8.8Y$ in which X is the optimum surface speed of the flap wheels in lineal feet per minute plotted as the abscissa and Y is the sheet travel through the machine in lineal inches per minute plotted as the ordinate.

It is accordingly the general object of the invention to remove tin plating from a sheet of tin plated steel along a surface adjacent a marginal edge thereof by the mechanical process of rotating an abrasive flap wheel having a peripheral grinding surface in light contact with the sheet surface adjacent the marginal edge of the sheet material from which it is desired to remove the tin while creating relative movement of the edge past the flap wheel with the surface speed of the flap wheel in lineal feet per minute being in the neighborhood of 8.8 times greater than the speed of the edge past the flap wheel in lineal inches per minute.

It is a more specific object of the invention to provide a mechanical process wherein a blank of tin plated steel having opposite marginal edges is moved along a path relative to a plurality of rotating flap type abrasive wheels having peripheral grinding surfaces positioned so as to progressively lightly contact opposed flat surfaces of the blank adjacent the opposite marginal edges for grinding the tin coating therefrom with the surface speed of the flap wheels in lineal feet per minute being in the neighborhood of 8.8 times the speed of the blank in lineal inches per minute along the path.

A still more specific object of the invention is to provide a method of making a tubular article from a blank of tin plated steel having opposite marginal side seam forming edges comprising: moving the blank along a path relative to a plurality of rotating flap type abrasive wheels having peripheral grinding surfaces positioned so as to progressively lightly contact opposite flat surfaces of the blank adjacent the opposite marginal side seam forming edges for grinding the tin coating and underlying oxides therefrom and smoothing the underlying steel surfaces with the surface speed of the flap wheels in lineal feet per minute being in the neighborhood of 8.8 times the speed of the blank in lineal inches per minute along the path; forming the blank into a tube so that opposed, now tin and oxide free and smooth blank surfaces adjacent the side seam forming marginal edges are in close overlapped relationship and then welding the overlapped surfaces together.

Still other and further objects and advantages of the invention will become apparent upon referring to the following description of the process of the invention and preferred embodiment of an apparatus for carrying out the process illustrated in the accompanying drawings in which:

FIG. 1 is a perspective view showing a portion of a preferred apparatus employed in removing tin from opposed flat surfaces adjacent opposite marginal edge portions of tin plated steel sheets;

FIG. 2 is a fragmentary sectional view at a greatly enlarged scale through an edge portion of a sheet of tin plated steel taken along section line 2—2 of FIG. 1 before the tin coatings are removed therefrom in accordance with the process of the invention;

FIG. 3 is a section similar to FIG. 2 taken along section line 3—3 of FIG. 1 but with the tin plate coatings having been removed on opposite surfaces of the blank adjacent the marginal edge thereof;

FIG. 4 is a fragmentary view taken along line 4—4 of FIG. 1 depicting the flap wheels in action removing the tin coatings from opposed flat surfaces of a tin plate blank adjacent a marginal edge of the blank; and FIG. 5 is a fragmentary perspective view of a blank prepared in accordance with the invention and having been formed into a tubular shape and welded along overlapped tin free portions thereof adjacent side seam forming overlapped marginal edges thereof.

FIG. 6 is a graph showing the relationship of flap wheel surface speed to sheet speed.

Referring to FIG. 1 of the drawings, it will be seen that tin plate container body blanks 10 are conveyed through grinding stations indicated generally at 11 and 12 of a grinding machine generally indicated at 13 only a portion of which has been illustrated. The blanks are pushed generally rightwardly as indicated by the directional arrow 14 by means of pushing blocks 15 and 16 equally spaced along respective horizontally disposed conveyor chains 17 and 18 that run in unison. The blanks are guided and supported by means of a plurality of suitably disposed upper and lower guides such as indicated at 21 and 22; the guides being shown broken away for illustration purposes.

Since grinding stations 11 and 12 are similar in construction and operation, only the details of grinding station 12 will be described. Grinding station 12 includes two variable speed motors 23 and 24 mounted on a common base 25. Variable speed motor 23 has a pulley 26 mounted on the output shaft thereof which turns or drives a belt 27 entrained thereon. Belt 27 is entrained around a second pulley 30 on the drive shaft 31 for a flap wheel 32. Drive shaft 31 is suitably rotatably journalled and supported (by means not shown) above the path of travel of the body blanks 10 and adjacent the path of the marginal edges 33 of the body blanks 10. A pulley 34 is mounted on the output shaft of the variable speed motor 24 and drives a belt 35 entrained thereover. Belt 35 is entrained around a pulley 36 mounted on a drive shaft 37 for a second flap wheel 40. Drive shaft 37 is suitably journalled and supported below the path of travel of the body blanks 10 on the conveyor chains 17 and 18 by suitable means not shown. The flap wheel 40 is disposed beneath the path of the marginal edges 33 of the body blanks.

It is preferred that the flap wheels 32 and 40 be spaced apart along the conveying run of the chain conveyors 17 and 18 as illustrated so that they do not work simultaneously on the same portion of a body blank, which might result in overheating of the body blank. As illustrated, the drive shaft 31 and 37 are parallel to each other and to the edges 33 of the body blanks 10. It is, however, feasible to skew the drive shafts 31 and 37 in a counterclockwise direction in planes parallel to the plane of travel of the blanks so that the shafts are at an angle with respect to the direction of travel of the marginal edges 33.

The drive shafts and flap wheels of the grinding station 11 are similarly positioned with respect to the path of travel of a marginal edge 41 at the opposite end of the blank 10 from the marginal edge 33.

In FIG. 2 is shown in section, at a greatly enlarged scale, a portion of the body blank 10 adjacent the maringal edge 41. The steel core of the blank 10 is indicated at 42. The upper surface of the steel core has a coating of tin plate 43 while a lower opposite surface thereof has a tin coating 44. FIG. 2 shows the condition of the body blank adjacent the edge 41 before this portion of the body blank is worked upon at the grinding station 11. FIG. 3 on the other hand is similar to the FIG. 2 showing but shows the condition of the body blank 10 adjacent the marginal edge 41 after this portion of the body blank has been worked upon at the grinding station 11. It will be seen in FIG. 3 that the upper tin coating 43 and any underlying oxides have been removed and the surface of the steel core smoothed adjacent the marginal edge 41 so as to provide an upper tin free and smooth lap seam surface 45. A similar lap seam surface 46 is provided on the underside of the blank 10 by removal of the tin coating 44, any underlying oxides that may be present and by smoothing out irregularities in the surface of the steel core 42. Likewise, the opposed upper and lower body blank surfaces adjacent the marginal edge 33 are worked on by the flap wheels 32 and 40 so as to provide smooth opposed tin and oxide free upper and lower lap seam surfaces 50 and 51 as best shown in FIG. 4.

In FIG. 4 the drive shafts 31 and 37 are shown broken away with the pulleys 30 and 36 and the belts 27 and 35 not illustrated for the sake of simplicity. It will be observed that the flap wheel 32 rotates in a clockwise direction as viewed in FIG. 4 and as illustrated by the directional arrow 52 so that the abrasive coated cloth flaps 53 move from right to left in a direction from the middle of the blanks 10 toward the marginal edge 33 while the peripheral flap wheel grinding surface 38 progresively removes the upper layer of tin plate 43 from along the lap seam surface 50. It is only necessary that the leading surface 54 of the cloth flaps 53 have abrasive material bonded thereto. Cloth flaps having an abrasive grit size of 50 on one side thereof have been found to give satisfactory performance. Flap wheel 40 which is similar in all respects to the flap wheel 32 has a peripheral grinding surface 47 that lightly contacts the lower tin plated surface 44 of the body blank 10 adjacent the marginal edge 33 to prepare the lap seam surface 51. As viewed in FIG. 4, the flap wheel 40 is rotated in a counter-clockwise direction as indicated by the directional arrow 55 so as to act on the tin plate 44 in a direction from the center of the blank 10 toward the marginal edge 33.

Since the flap wheels arranged at the grinding station 11 act on the body blank 10 adjacent the edge 41 thereof to prepare the lap seam surfaces 45 and 46 in the manner just explained with respect to the preparation of the lap seam surfaces 50 and 51 adjacent the marginal edge 33 by the flap wheels 32 and 40 of the grinding station 12 it is believed to be unnecessary to again repeat this explanation with respect to the grinding station 11.

Upon leaving the grinding machine 13 with the lap seam forming surfaces prepared in accordance with the method of the invention, the blanks 10 are formed around a suitable mandrel with the marginal edges 33 and 41 in overlapped relationship as illustrated in FIG. 5. It will be noted that the smooth tin and oxide free lap seam surfaces 46 and 50 are in face to face engagement along the side seam 56 of the formed container body 57. The tin free lap seam surface 45 is exposed on the interior side of the container body 57 while the lap seam surface 51 is exposed on the exterior side of the container body 57. Contacting lap seam surfaces 46 and 50 are welded together by means of a copper resistance welding roll or other copper welding tool pressing against the interiorly disposed lap seam surface 45 with an oppositely disposed welding roll or other welding tool simultaneously being pressed against the outwardly disposed lap seam surface 51. In accordance with the invention, the prepared lap seam surfaces 45–46 and 50–51 are generous in width, so that using welding rolls or tools, narrower in width than the prepared lap seam surfaces, there is no danger that they will pick up tin from the adjacent unprepared tin plated surfaces 43 and 44. The so formed side seam 56 will nearly always be found to be strong and tight due to substantially all of the tin and oxides being removed from the facing surfaces 46 and 50 thereof, and also due to the surfaces having been smoothed. In addition, the side seam 56 will be of great strength because the steel core 42 is at substantially full thickness at the marginal edges 33 and 41 due to the fact that the surfaces 50–51 and 45–46 are parallel and do not taper down and appreciable amount toward the respective marginal edges 33 and 41 as they do in some of the prior art approaches.

Referring to FIG. 6, which is a graph, it will be seen that along the ordinate is plotted the speed of the sheets or blanks 10 on the conveyor chains 17 and 18 through the grinding stations 11 and 12 in lineal inches per minute. Along the abscissa is plotted the surface speed of the flap wheels at the grinding stations 11 and 12 in lineal feet per minute based on 10 inch diameter flap wheels having a 1 inch face. Also plotted along the abscissa is the corresponding rotational speed of the flap wheels in revolutions per minute for each surface speed given. In making up the graph of FIG. 6, the conveyor chains 17 and 18 were run in unison at various speeds and the speed of the flap wheels at the stations 11 and 12 were adjusted to the optimum speed for the preparation of the surfaces 45–46 and 50–51 in a single pass of the blanks 10 through the grinding machine 13. As will be seen in the graph, when the blank speed was adjusted to 470 lineal inches per minute, the corresponding optimum surface speed of the flap wheels was determined by visual observation to be 4200 lineal feet per minute or reasonably in the neighborhood of this speed. When the blank speed was adjusted to 621 lineal inches per minute the optimum surface speed was found to be about 5,500 lineal feet per minute. Likewise, when the blank speed was adjusted to be 680 lineal inches per minute, the corresponding optimum flap wheel surface speed was in the neighborhood of 6,000 lineal feet per minute. It will be noted that the ordinate line 680 intersects the abscissa line 6,000 at a point 60; likewise the ordinate 621 and the abscissa 5,500 intersect at a point 61, and the ordinate 470 intersects the abscissa 4,200 at a point 62. Other points determined in a manner similar to the determination of the points 60–62 were plotted on the graph of FIG. 6 and it was found that a line 63 drawn through the plotted points was, for all practical purposes, a straight line. The straight line 63 indicated that linear algebraic relationship existed between the speed of the blanks and the surface speed of the flap wheels when optimum results were achieved. Now by dividing the value of the abscissa by the value of the ordinate at the variously determined point locations and averaging the results, it was found that in order to achieve optimum results, the flap wheel surface speed in lineal feet per minute should be in the enighborhood of 8.8 times the sheet or blank speed in lineal inches per minute. During the performance tests, it was found that the various flap wheels should contact the tin plate surfaces only lightly as otherwise localized overheating of the blanks may occur and the flap wheels may become clogged with tin.

During the operation of the grinding machine 13, in accordance with the teachings of the invention, it will be found that the flap wheels will wear down so as to expose fresh abrasive to the body blanks. In order to achieve the desired flap wheel surface speed as the flap wheels wear down it is necessary from time to time to measure the diameter of the flap wheels and make adjustments to the variable speed motors to bring the surface speed of the flap wheels up to the optimum speed.

In practicing the invention, it is most convenient to employ a graph like in FIG. 6 with revolutions per minute of various diameter flap wheels within the wear range of the wheels smaller in diameter than the initial 10 inch diameter of new flap wheels plotted adjacent the surface speed scale. By calculating the revolutions per minute for each reduced wheel diameter necessary to give the listed flap wheel surface speeds, it then becomes an easy matter to select the correct speed of rotation of the flap wheels from the graph as they wear down in use.

Although it was experimentally determined that optimum performance of the invention is achieved when the surface speed of the flap wheels in lineal feet per minute is approximately 8.8 times the speed of the sheet through the grinder, the benefits of the invention can be substantially achieved when the multiplication factor is as low as 8.0 and as high as 9.6.

Since minor variations within the spirit of the invention will become apparent to one skilled in the art, the scope of the invention is meant to be as set forth in the following appended claims.

What is claimed is:

1. A mechanical process for removing a protective metal coating from a sheet of steel along a surface adjacent a marginal edge thereof comprising: rotating an abrasive flap wheel having a peripheral grinding surface in light contact with the sheet surface adjacent the said marginal edge while creating relative movement of the said marginal edge past the flap wheel with the surface speed of the flap wheel in lineal feet per minute being in the neighborhood of 8.8 times greater than the relative speed of movement in lineal inches per minute of the said marginal edge past the flap wheel.

2. A mechanical process for preparing a welding surface adjacent a marginal edge of a sheet of plated steel comprising: moving the sheet along a path through a grinding station at a predetermined speed; rotating an abrasive flap wheel at the grinding station at a rotational speed that gives the flap wheel a peripheral grinding surface speed in lineal feet per minute in the neighborhood of 8.8 times the speed of the sheet, and progressively lightly contacting the sheet surface adjacent the said marginal edge with the flap wheel grinding surface to substantially remove all of the plating and any underlying oxides and smooth the underlying steel therealong.

3. A mechanical process for preparing welding surfaces adjacent opposite marginal edges of a sheet of tin plated steel comprising: moving the sheet along a path through grinding stations at a predetermined speed; rotating a plurality of flap wheels at the grinding stations at a rotaional speed that gives the flap wheels a peripheral grinding surface speed in lineal feet per minute in the neighborhood of 8.8 times the speed of the sheet in lineal inches per minute, and progressively lightly contacting the sheet on opposite sides thereof adjacent the opposite marginal edges with a flap wheel grinding surface to substantially remove all of the tin plating and any underlying oxides and smooth the underlying steel along the surfaces adjacent the opposite marginal edges.

4. A mechanical process for making a tubular article from a blank of tin plated steel having opposite marginal side seam forming edges comprising: moving the blank along a path through grinding stations at a predetermined speed; rotating a plurality of flap wheels at the grinding stations at a rotational speed that gives the flap wheels a peripheral grinding surface speed in lineal feet per minute in the neighborhood of 8.8 times the speed of the blank in lineal inches per minute; progressively lightly contacting the sheet on opposite sides thereof adjacent the opposite marginal edges with a flap wheel grinding surface to substantially remove all of the tin plating and any underlying oxides and smooth the underlying steel to provide smooth steel welding surfaces adjacent the side seam forming marginal edges; forming the blank into a tube so that opposed welding surfaces are in close overlapped relationship and welding the overlapped surfaces together.

References Cited
UNITED STATES PATENTS

| | | | |
|---|---|---|---|
| 1,252,025 | 1/1918 | Ploehn | 29—483 |
| 2,372,599 | 3/1945 | Nachtman. | |
| 2,475,566 | 7/1949 | Karmazin | 29—482 X |
| 2,678,523 | 5/1954 | Leggett | 51—337 |
| 2,787,827 | 4/1957 | Karmazin | 29—482 X |
| 3,241,267 | 3/1966 | Block et al. | 51—336 |

JOHN F. CAMPBELL, *Primary Examiner.*

J. L. CLINE, *Assistant Examiner.*